United States Patent [19]
Ciniglio et al.

[11] Patent Number: 5,904,610
[45] Date of Patent: *May 18, 1999

[54] METHOD AND APPARATUS FOR STRIPPING A COATING FROM A WIRE

[76] Inventors: Alexander James Ciniglio, Pharisee House, Pharisee Green, Ongar Road, Great Dunmow, Essex CM6 1JH, United Kingdom; Larry Hall, 43 Eastslade, Palatine, Ill. 60067

[ * ] Notice: This patent issued on a continued prosecution application filed under 37 CFR 1.53(d), and is subject to the twenty year patent term provisions of 35 U.S.C. 154(a)(2).

[21] Appl. No.: 08/554,903

[22] Filed: Nov. 9, 1995

[30] Foreign Application Priority Data

Nov. 9, 1994 [GB] United Kingdom .................... 9422610
Jul. 10, 1995 [GB] United Kingdom .................... 9514051
Sep. 15, 1995 [GB] United Kingdom .................... 9518956

[51] Int. Cl.$^6$ ................................ B24B 1/00; B24C 1/00
[52] U.S. Cl. ................................................ 451/38; 451/82
[58] Field of Search ................................ 451/38, 82, 83, 451/87, 74; 83/177

[56] References Cited

U.S. PATENT DOCUMENTS

| | | | |
|---|---|---|---|
| 2,671,363 | 3/1954 | Wells | 81/9.51 |
| 3,160,991 | 12/1964 | Bradley | 51/9 |
| 3,530,746 | 9/1970 | Gudmestad | 81/9.51 |
| 3,881,374 | 5/1975 | Gudmestad | 81/9.51 |
| 4,741,130 | 5/1988 | Tano et al. | 451/87 |
| 4,827,679 | 5/1989 | Earle, III | 451/87 |
| 4,872,293 | 10/1989 | Yasukawa et al. | 451/87 |
| 4,872,294 | 10/1989 | Watts | 451/89 |
| 4,937,985 | 7/1990 | Boers et al. | 451/87 |
| 5,018,317 | 5/1991 | Kiyoshige et al. | 451/87 |
| 5,111,652 | 5/1992 | Andre | 451/87 |

FOREIGN PATENT DOCUMENTS

| | | |
|---|---|---|
| 2161049 | 7/1973 | France . |
| 2846737 | 4/1978 | Germany . |
| 557608 | 12/1974 | Switzerland . |

OTHER PUBLICATIONS

WPI Acc.No. 80–E1413C/19, English–language abstract of DE 2846737.
GB Search Report for GB 9514051.3 dated Sep. 27, 1995.

*Primary Examiner*—David A. Scherbel
*Assistant Examiner*—Derris H. Banks
*Attorney, Agent, or Firm*—Ostrolenk, Faber, Gerb & Soffen, L.L.P.

[57] ABSTRACT

Enamel insulation is stripped from a wire 1 by abrading the enamel coating with a pressurized stream of particles such as baking power, sodium bicarbonate. The particles chip off the relatively brittle coating, while the softer underlying wire is not harmed. The wire 1 passes through a chamber 4 and nozzles 18 direct the particle stream onto the wire 1. The chamber is evacuated at an outlet 34 to draw waste particles from the chamber 4. In another embodiment, the particle stream itself is directed through an outlet at the opposite side of the wire to entrain the waste particles and exhaust them from the chamber.

4 Claims, 7 Drawing Sheets

METHOD AND APPARATUS FOR STRIPPING A COATING FROM A WIRE

INTRODUCTION

The present invention relates to a method and apparatus for stripping a coating from a wire. In particular, the invention relates to stripping an enamel insulation coating from copper wire which is being fed to a coil winding station.

BACKGROUND

When soldering wire having a low temperature enamel coating, the enamel insulation is burnt away by the molten solder, allowing an effective, electrically conducting joint to be made. However, high temperature enamel coatings are becoming more common, and these must be removed from the wire before soldering.

The commonly used prior art system for removing high temperature enamel is a sharp blade or edge, which scrapes away the enamel coating.

In DE-A-2846737 a wire is inserted into a channel and powder particles are blown along the channel to remove the coating. At the channel outlet, the wire casing is shielded or an air jet is used to direct the particles away from the wire.

SUMMARY OF THE INVENTION

The present invention provides a method of stripping a coating from a wire in which the coated wire is subjected to a stream of particles to abrade or chip the coating from the wire. Typically a powder, such as "baking powder" (sodium bicarbonate) may be used.

It has been found that the particles will cause the coating to flake away from the wire surface, but the softer underlying wire will be unharmed.

More particularly, the invention provides an apparatus for removing a coating from a wire, the apparatus comprising a chamber through which the wire is drawn, a nozzle for directing a stream of particles on to the wire in the chamber to remove the coating, and means for drawing waste material from the chamber.

The invention is particularly suited for use with a coil winding machine, when it is desired to strip the coating from the wire which is to be wrapped around the coil tag. A difficulty with the usual powder stripping processes is that the powder will contaminate nearby apparatus and the adjacent wire length. Thus the invention provides an apparatus in which suction is applied to the region of the wire which is being stripped in order to draw away the powder particles after they have impinged on the wire.

In a particularly preferred embodiment the suction is created by feeding an air stream, which carries the particles, through an outlet on the opposite side of the wire. The air stream will create a partial vacuum near the wire and so entrain the particles and enamel chippings and carry them through the outlet. The effect is thought to be similar to the Venturi effect, although a classical Venturi shaped nozzle has not been found necessary in practice. In another form, the wire is passed through a chamber and abraded with a particle stream. A separate suction is applied, preferably by means of an air stream passing through the chamber.

Preferably a plurality of particle streams are used to strip away the coating for 360 degrees about the wire. In another preferred form, the nozzle is rotated about the wire.

The wire may be moved through the chamber during the stripping operation, to strip the coating from a length of wire.

BRIEF DESCRIPTION OF THE DRAWINGS

The invention will be further described by way of example with reference to the accompanying drawings, in which.

DESCRIPTION OF THE PREFERRED EMBODIMENTS

Figure 1:
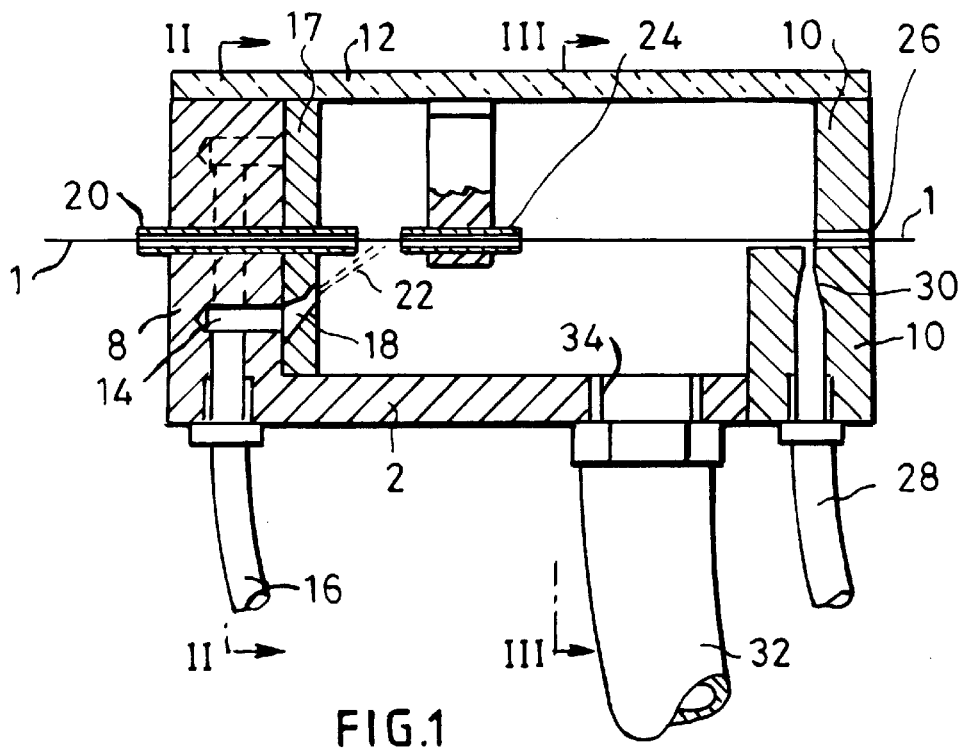
FIG. 1 is a cross-sectional view through a first embodiment of the invention.
Figure 2:
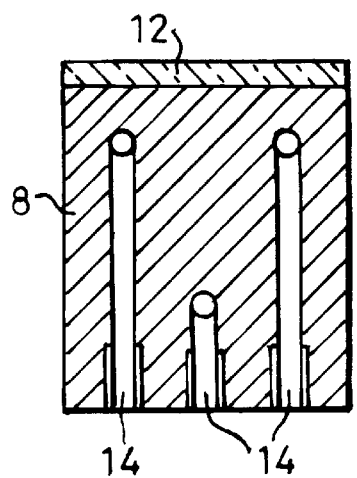
FIG. 2 is a cross-section on line II—II of FIG. 1.
Figure 3:
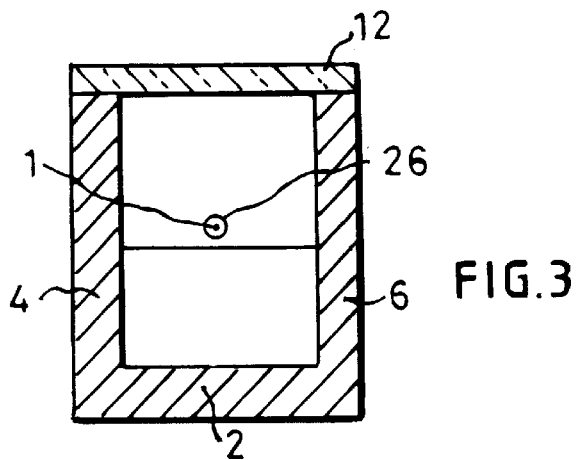
FIG. 3 is a cross-section on line III—III of FIG. 1.

A first, particularly preferred embodiment of the invention will now be described with reference to FIGS. 1 to 3.

A wire stripping apparatus comprises a housing defining therein closed chamber defined by a bottom wall 2, side walls 4, 6, end walls 8, 10 and a transparent cover 12.

The end wall 8 has three inlet conduits 14 connected to respective supply pipes 16 which feed a high pressure air stream carrying powder particles, such as baking powder. A manifold 17 has tapering nozzles 18 (one is shown in FIG. 1) in register with outlets of the conduits 14.

A tube 20 extends through the end wall 8 and manifold 17 and forms an inlet for a wire 1. The nozzles 18 direct particle streams 22 on to the wire near the tube 20.

A guide tube 24 supports and guides the wire 1 just beyond the particle streams 22.

Figure 6:
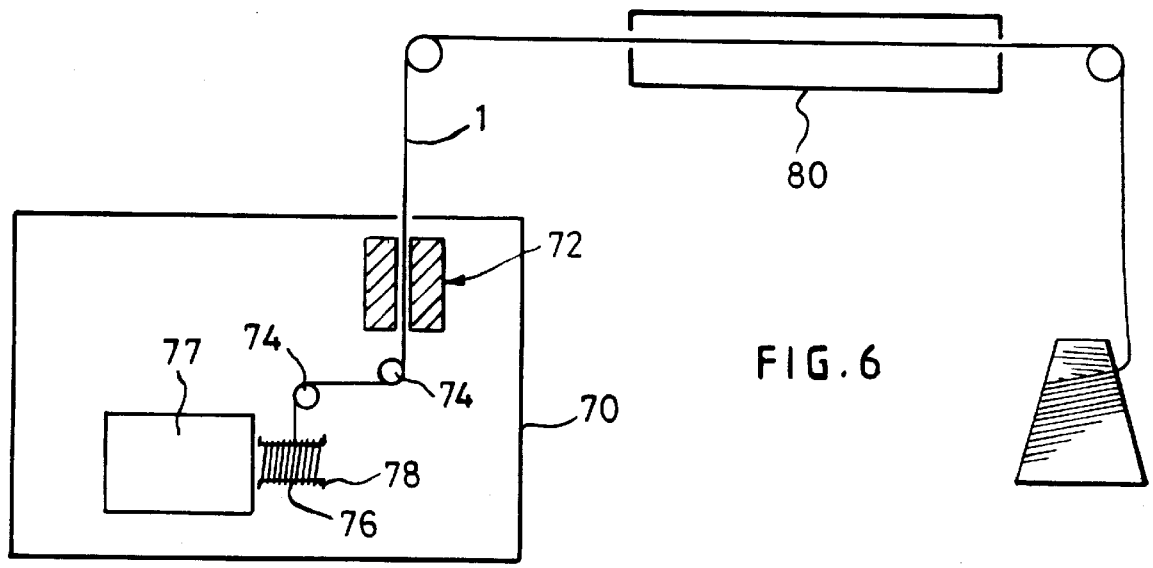
FIG. 6 shows schematically the embodiment of FIG. 1 or 2 with a coil winding machine.

The wire 1 passes through an outlet aperture 26 in the end wall 10 and on towards a coil winding station (see FIG. 6).

An air jet is fed onto the wire 1 near the outlet aperture 26, from a supply pipe 28 and a nozzle 30 formed in end wall 10. The air jet helps to remove any sticking powder particles from the wire 1, and also causes air to be sucked into the chamber through outlet 26, this preventing the escape of waste particles.

A vacuum is applied to the chamber via tube 32 and outlet 34 to draw off the waste particles and coating chippings and the air streams.

The streams 22 from nozzles 18 are arranged to impinge on the wire 1 at a 45 degree angle from the centerline and are equi-spaced at 120 degrees around the circumference.

Angling the air streams 22 to the wire allows the waste particles to leave the area of impingement in such a way that the incoming stream of particles is not disturbed. This causes the stripping action to be more efficient.

The 45 degree angle also creates a partial vacuum in tube 20 which draws air into the assembly from outside. This ensures that no waste particles or enamel chippings escape via tube 20 to the outside of the assembly.

Providing nozzle outlets 18 in the manifold 17 around the circumference of the wire 1, at 120 degree spacing, ensures that the enamel coating around the entire diameter of the wire 1 is removed. In this case 3 streams of particles are used, although more could be used if desired. If fewer than three streams were used it would be desirable to provide relative rotation between the wire and the chamber to strip the enamel coating from the complete circumference of the wire.

In use with a coil winding apparatus, the wire is fed rapidly through the chamber; with the air and particle streams turned off, for coil winding. The wire is then fed more slowly through the chamber to strip the coating from a length of wire. Since the chamber is effectively sealed against the egress of powder particles, the stripping apparatus can be used in close proximity to the coil winder without fear of contamination.

Figure 4:
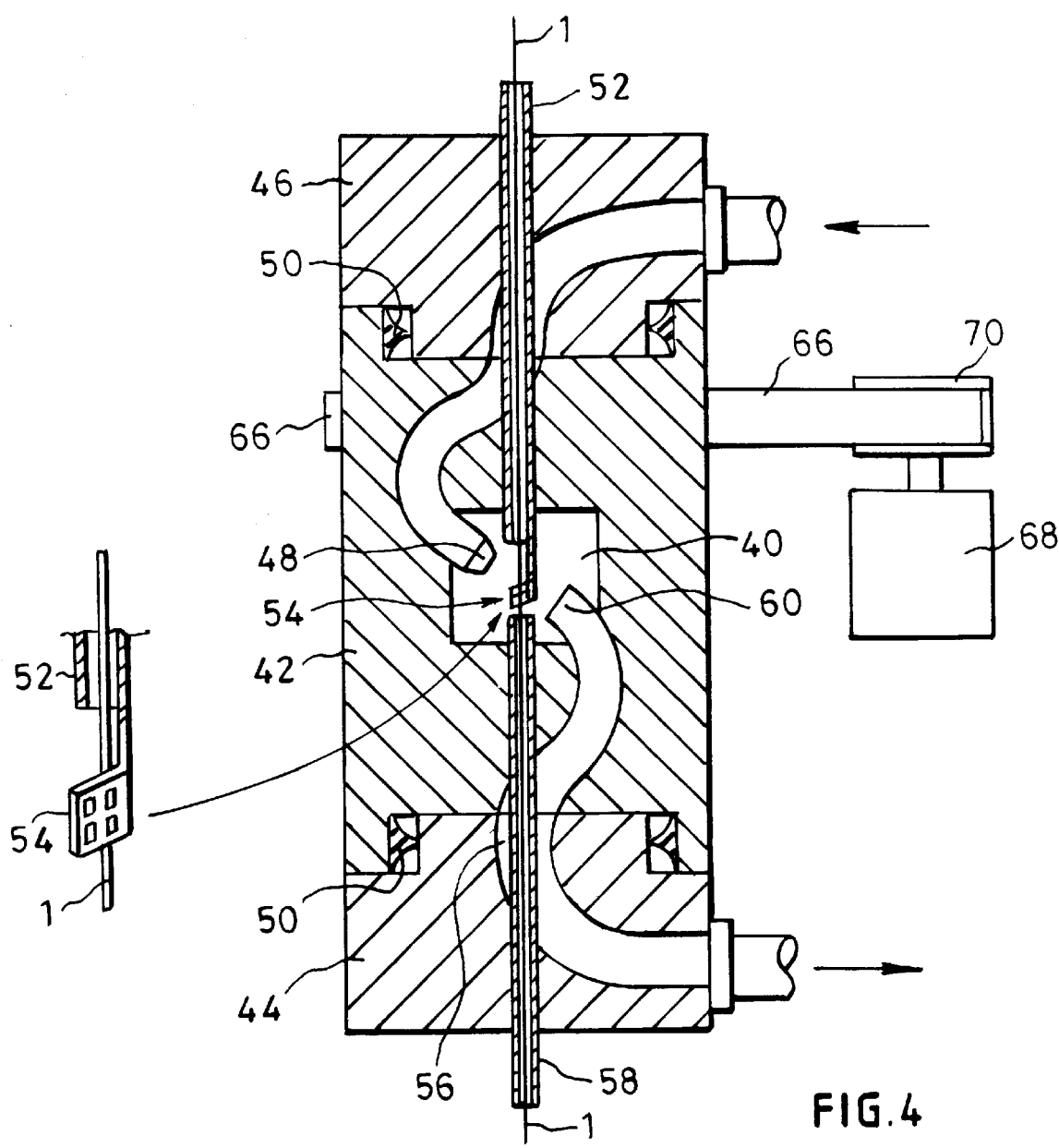
FIG. 4 shows a cross-section through a second embodiment of the invention.

A second, particularly preferred embodiment is shown in FIG. 4. In this embodiment a single particle stream is used, and the stream is rotated about the wire 1 to strip off the coating.

A closed chamber 40 is formed in a central body 42. The body 42 is rotatably supported between ends 44, 46 which are fixed. A conduit 47 for feeding a particle stream is formed in the end 46 and body 42, passing between the end 44 and into the central body 42 at the axis of rotation of the body 42. The conduit exits into the chamber 40 at a nozzle 48. A circular seal 50 allows rotation between the body 42 and end 46, and prevents egress of the particle stream from the conduit at the junction between the end 46 and body 42. A wire inlet tube 52 passes through the end 46 and body 42 to the chamber 40 and ends in a support mesh 54.

A outlet conduit 56 has an end 60 in the chamber 40 positioned opposite the nozzle 48, and passes through the central body 42 and the end 44. A circular seal 50 is provided between the central body 42 and the end 44. A wire outlet tube 58 passes through the end 44 and central body 42.

A wire 1 is fed through the tubes 52, 58. The tubes 52, 58 are sealed in the ends 44, 46, and the central body 42 is rotatable about the tubes.

In use, wire is fed rapidly through the tubes 52, 58 for coil winding. To strip the coating from a section of wire, the wire is slowed and a particle stream is fed in through the conduit 47, to impinge on the wire 1 near the mesh support 54. The stream continues into the outlet conduit 56. The nozzle 48 concentrates the particle stream, and the passage of the stream into the larger open end 60 of the conduit 56 serves to entrain waste particles and coating chips into the outlet stream and evacuate the chamber 40.

Figure 5:
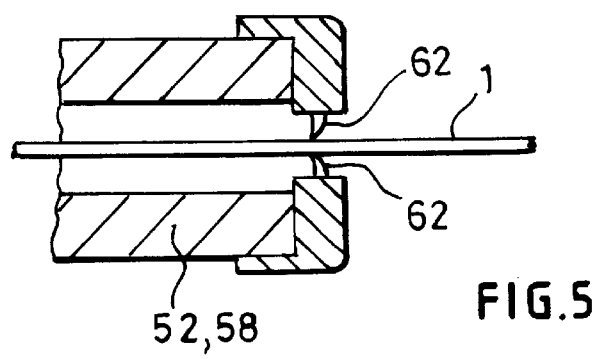
FIG. 5 shows a detail of a modification of the embodiment of FIG. 4.

As shown in FIG. 5, lip seals 62 may be provided between the wire and outer ends of the tubes 52, 58 but the Venturi effect may be used to ensure that waste particles are sucked into the outlet conduit 56 and do not pass out along the tubes 52, 58.

To strip the coating from the complete circumference of the wire 1, the central body 42 is rotated by a belt 66 driven by a motor 68 and pulley 70.

FIG. 6 shows schematically a coil winding machine 70 incorporating a wire stripping device of the invention illustrated schematically at 72.

Wire 1 is fed through the device 72 and then via pulley wheels 74 to a bobbin 76 mounted on the winding station 77.

In use a region of the wire 1 is stripped by the apparatus 72 and is then fed through to a tag 78 on the bobbin 76 and wrapped around the tag 78. Since the distance between the tag 78 and apparatus 72 is fixed, the stripped region of the wire 1 can be easily positioned automatically around the tag 78. The bobbin 76 is then wound and a further region of the wire 1 is stripped for winding around a second tag 78 (not shown).

When winding thin wire, a skein is formed in the wire for wrapping around a tag 78. The apparatus of the invention may be used to strip enamel coating from the outer surfaces of the formed skein, or it may be mounted upstream of the skeining machine 80 to strip the wire before skeining.

An independent wire feed device may be employed to feed the wire 1 through the stripping device during the stripping operation rather than using the coil winder feed. A reserve of wire could be provided for this, and kept under tension during the winding operation.

Other nozzle arrangements and embodiments will now be described.

Figure 7:
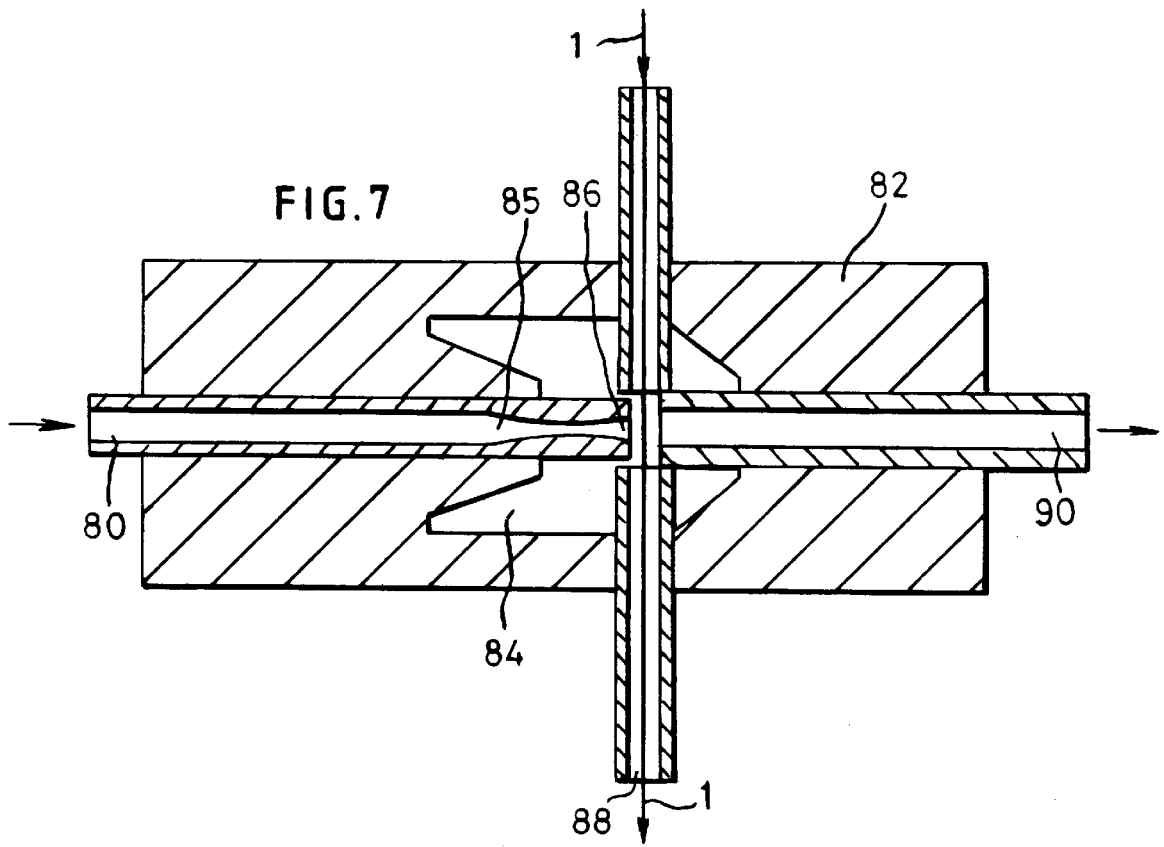
FIGS. 7 through 14 show schematically various arrangements of nozzle for directing a powder stream onto a wire.

FIG. 7 shows a simplified arrangement in which an inlet nozzle 80 for a powder stream is mounted in a body 82, which defines a central chamber 84. The pressurized air stream carrying the abrading powder is fed into a narrowing throat 85, which opens out into an expanding throat 86 just before a junction with a central passage 88 through which the wire 1 is fed. Throats 85, 86 are shaped to provide a Venturi effect so that a partial vacuum is created. An outlet 90 is formed by a nozzle having a larger inner diameter than the throat 86. Abrading particles, and the enamel chipped from the wire 1, are sucked into the air stream and carried into the outlet 90.

Figure 8:
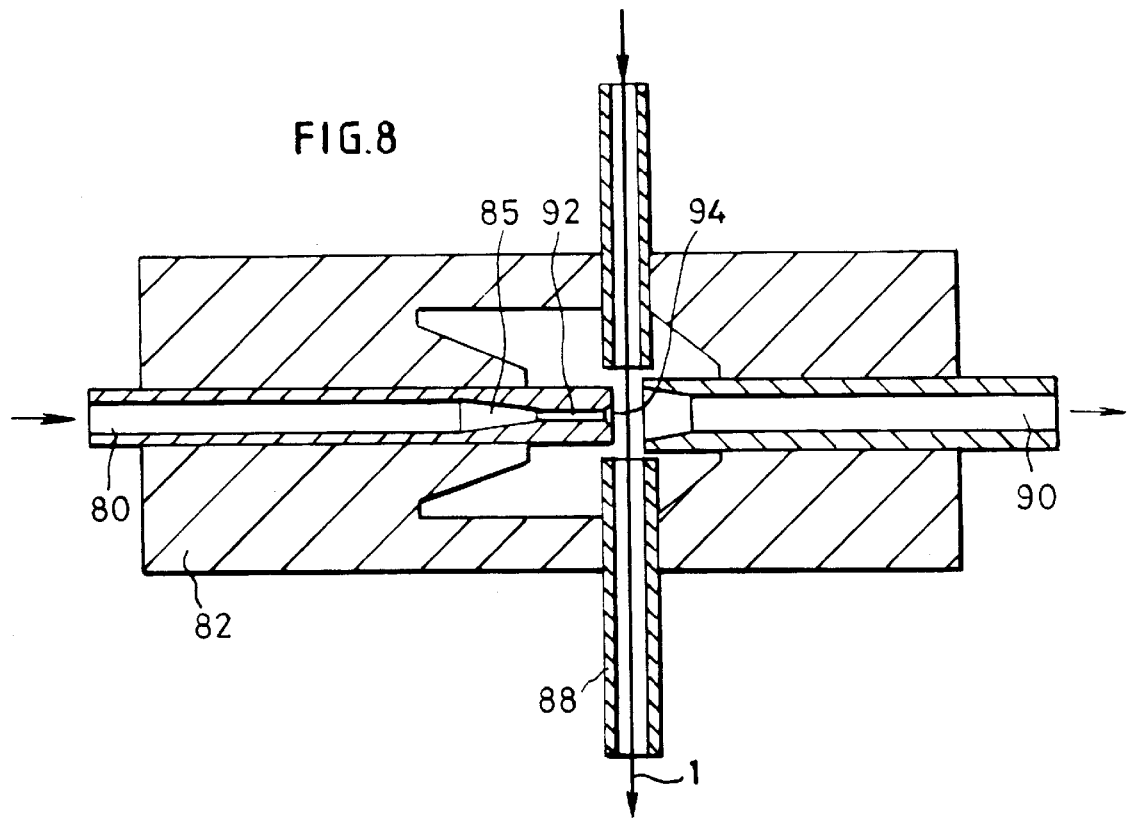

In FIG. 8, the narrowing throat 85 ends in a constant cross-section portion 92 and a short expanding throat portion 94. The outlet 90 has an expanded end to receive the air stream, which expands into the junction between the central passage 88 and inlet and outlet 80, 90.

Figure 9:
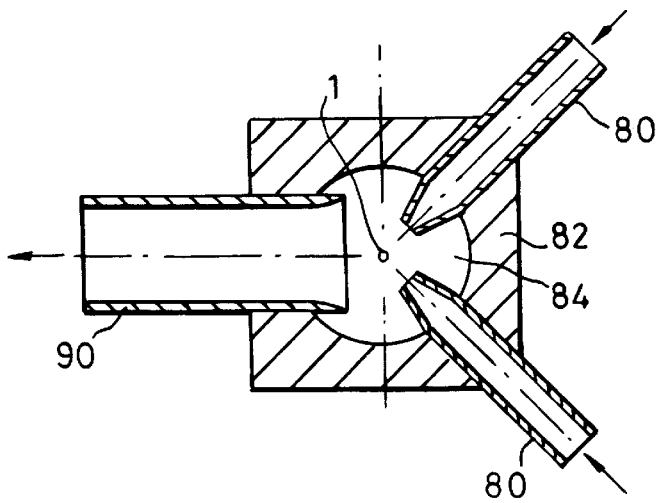
Figure 11:
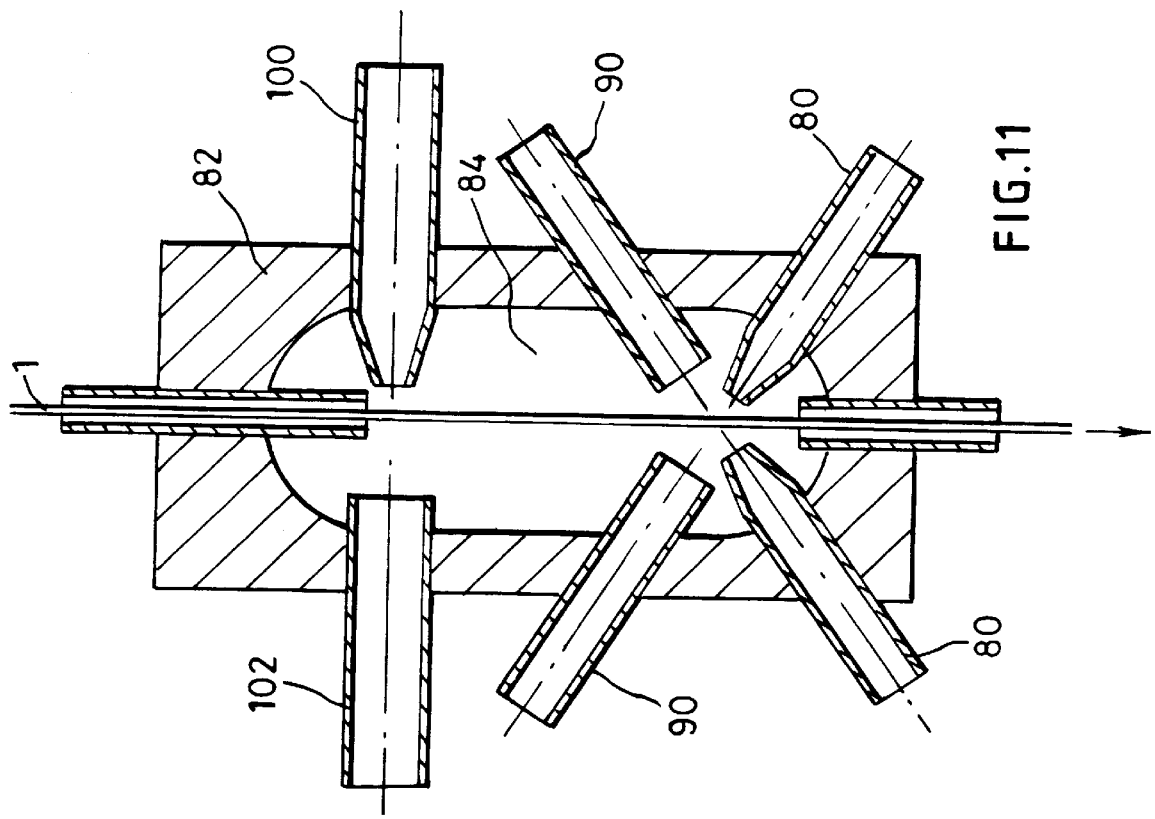
Figure 10:
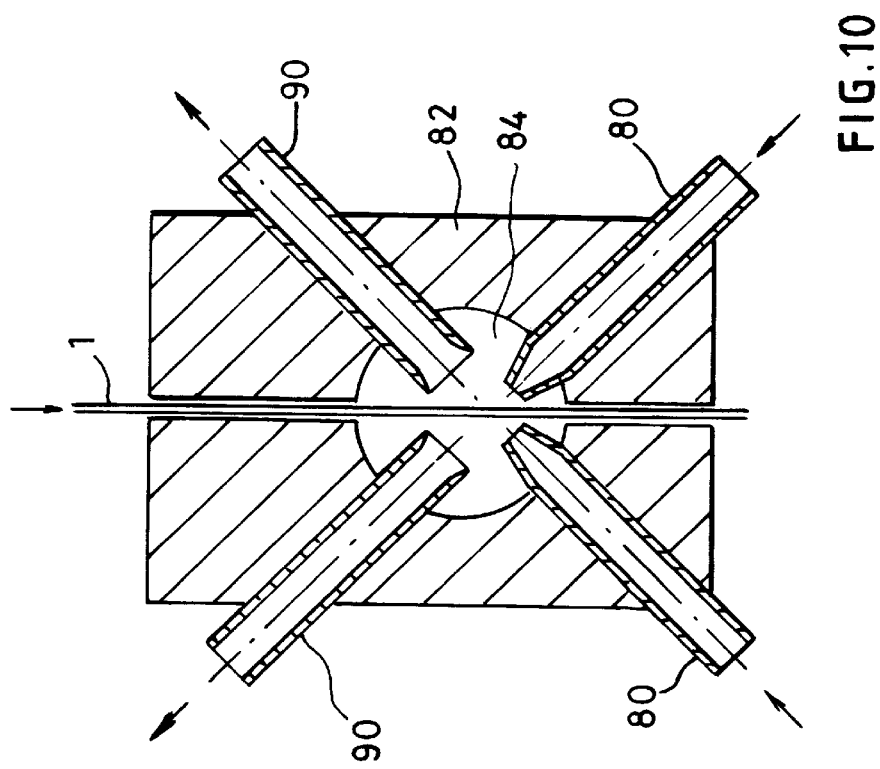

FIGS. 9, 10 and 11 show other embodiments of the invention and illustrate in particular different arrangements for the nozzles 80, 90 for delivering and removing the abrading particles.

In the embodiment of FIG. 9, two inlet nozzles 80 subtend an angle of about 90 degrees at the wire 1. The outlet 90 has a larger cross-section than the inlet nozzles 80 and has an opening positioned close to the wire 1 to receive the air streams from the nozzles 80. The use of two nozzles 80 ensures that the wire insulation is stripped over at least half the circumference of the wire 1.

In the embodiment of FIG. 10, the inlet nozzles 80 are at an angle to the direction of travel of the wire 1. In the embodiment as shown, the nozzles 80 form an acute angle with the forward (downward) direction of travel, and an outlet 90 is provided in-line with each inlet nozzle 80. The inlet nozzles 80 may be angled to reduce interference between the respective air streams. Directing the particles stream at an acute angle to the axis of the wire, as shown in FIG. 10, appears to be more efficient at removing the enamel coating. However, the crossing streams can be less efficient at removing waste: and so it may be preferred to stagger the streams along the length of the wire so that they do not interfere.

In the embodiment of FIG. 11, three inlet nozzles 80 are provided spaced at 120 degrees around the wire circumference (only two are shown), and additional suction is provided by a nozzle inlet 100 and outlet 102 through which only air is passed.

Figure 12:
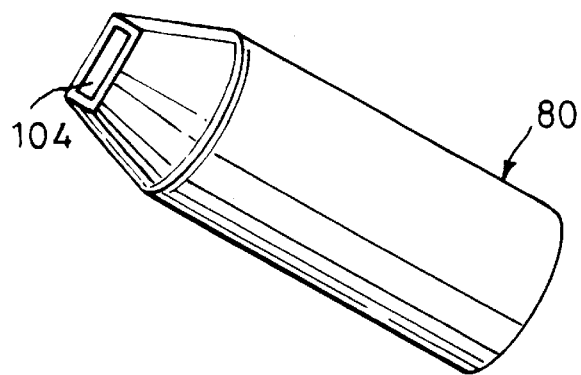

FIG. 12 shows a perspective view of a nozzle 80 of the embodiments of FIGS. 9 to 11. The nozzle has a generally circular cross-section body and tapers to a rectangular outlet 104.

Figure 13:
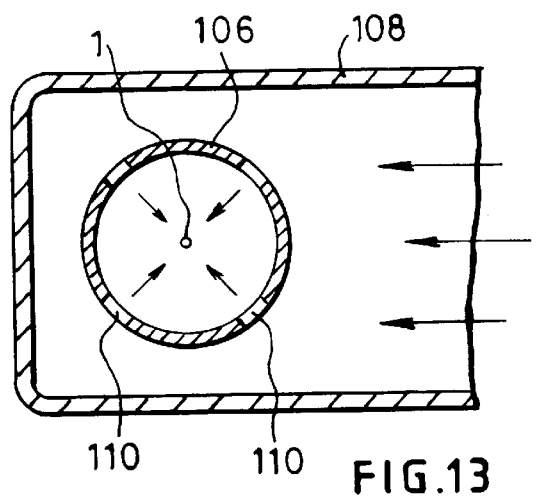

FIG. 13 shows another embodiment of the invention, in which the inlet nozzle is in the form of a cylinder 106 through which the wire passes. The particle air stream is fed to a housing 108 surrounding the cylinder and passes through a small apertures 110 in the cylinder 106 to impact on the wire 1. The particle air stream will pass along the wire and is then sucked from the chamber by a nozzles (not shown) such as the nozzle 56 of FIG. 7. This embodiment has been found to be considerably less efficient, probably due to the difficulty of maintaining a high directional velocity for the particle stream.

Figure 14:
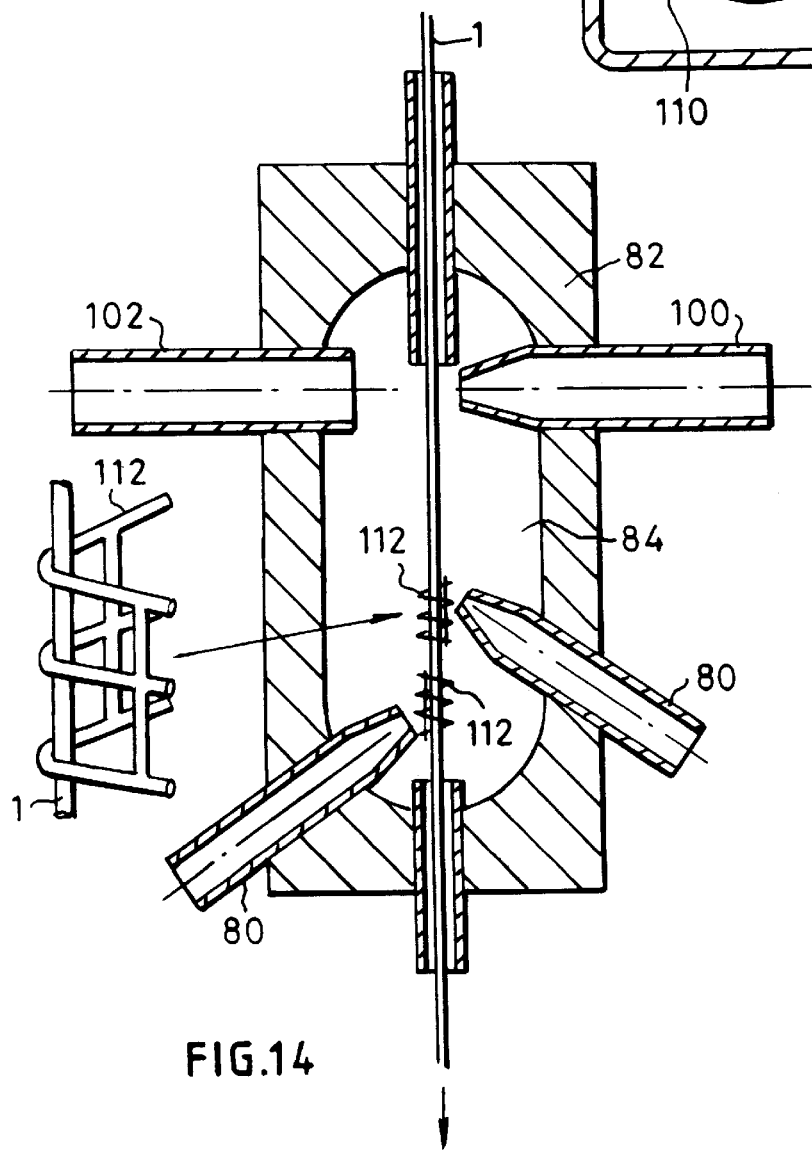

There is a tendency for the wire to vibrate in the particle stream, which reduces the efficiency of the stripping operation. FIG. 14 shows schematically a presently preferred system in which the wire 1 is supported in a mesh 112 in the vicinity of the particle stream. The nozzles 80 are angled to the axis of the wire, and staggered along its length. Three nozzles 80 may be provided around the wire spaced at 120 degree. The mesh 112 may interfere with the passage of the particle steam and so an additional nozzle 100 and outlet 102 is provided to draw waste from the chamber 84, as in the embodiment of FIG. 11.

Figure 15:
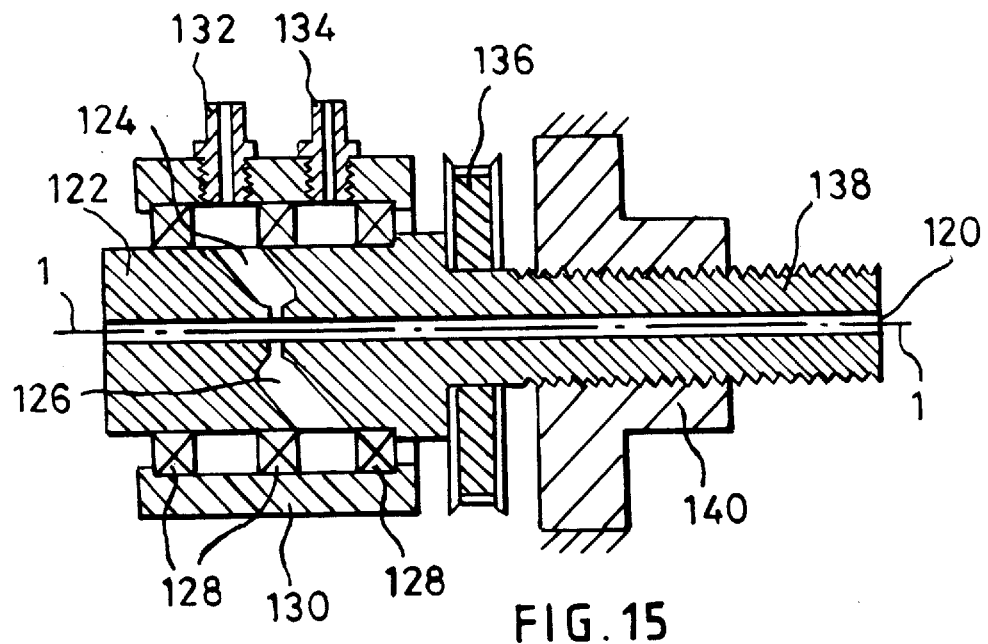
FIG. 15 shows an embodiment in which the stripping device is moved along the wire to strip a length of wire.
Figure 16:
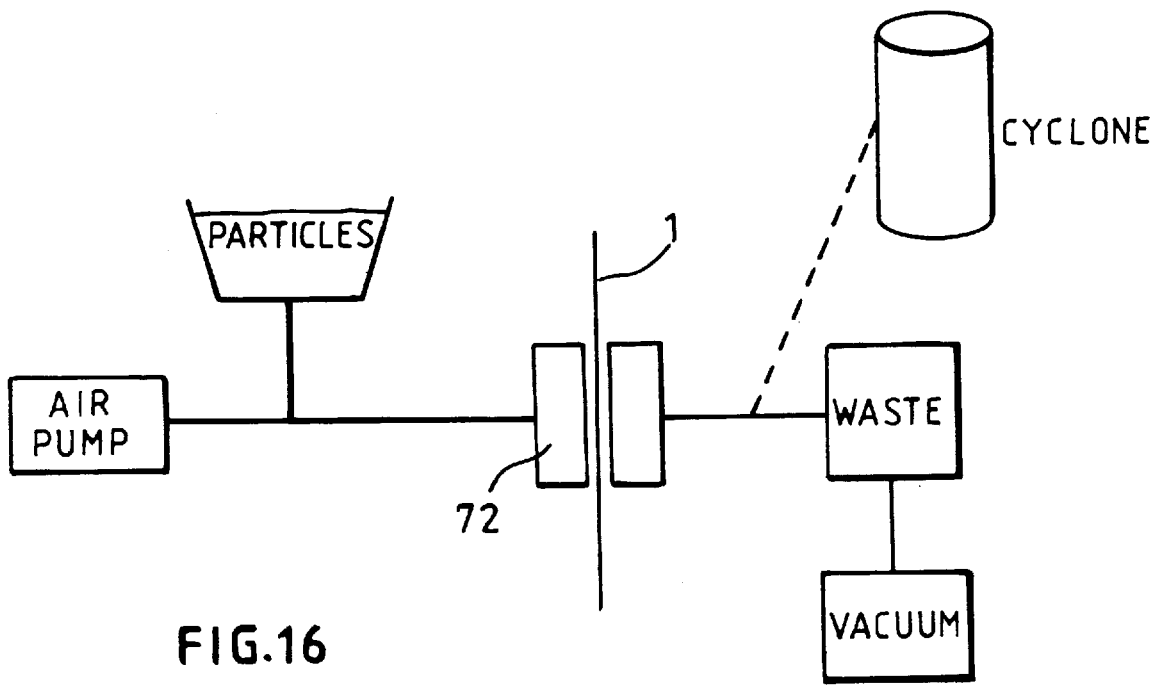
FIG. 16 illustrates schematically an embodiment of the invention with a powder supply and waste collection arrangement.

In the embodiment of FIG. 15, a coated wire 1 is routed through a central passage 120 in an inner housing 122 which contains a cross-drilled inlet 124 and an outlet 126. The inlet and outlet are shaped to provide a suction effect so that waste material is drawn out through the outlet 126 by the air stream passing across the central passage 120.

During operation a pressurised stream of powder such as baking powder is introduced into the inlet 124. This stream hits the coated wire 1 and the particles of powder in the stream remove the coating by abrasion. The inlet 124 and outlet 126 are shaped to create a partial vacuum across the passage 120 ensuring that waste material will not escape from the passage 11. It has been found that this can be achieved by having the inlet 124, near the passage 120, of smaller internal diameter than adjacent end of the outlet 126.

The inner housing is mounted in bearings 128 connected to an outer housing 130. An inlet port 132 is provided in the outer housing to deliver the pressurised powder stream and an outlet port 124 for the air stream and waste. The inner housing is rotated about the wire via a pulley 136 so that the stream is powder will strike the wire around the full circumference.

One end 128 of the inner housing is threaded into a stationary housing 140 so that during rotation the inner housing will move axially with respect to the wire so that a predetermined length of the coating can be removed. The direction of rotation can be reversed for alternate stripping operations, or the inner housing returned to a datum position between stripping operations.

FIG. 15 shows schematically an air pump for producing a flow of pressurised air and a reservoir for particles such as sodium bicarbonate. Such apparatus for delivering a pressurized stream is well known in the art. The particles are fed into the stream of pressurized air and directed to the wire stripping apparatus. The outlet of the apparatus is fed to a waste chamber for collecting waste particles. In the embodiment of FIG. 1, a vacuum pump is applied to the line to the waste chamber, and a cyclone or the like may be used for collecting waste particles, which can then be re-used if desired.

We claim:

1. Wire stripping apparatus for stripping an enamel coating from a surface of a portion of a continuous length of said wire intermediate the ends thereof, said wire stripping apparatus being operable with a supply of enamel coated wire and means for moving said wire axially through said apparatus, said apparatus comprising a substantially closed housing defining therein a first passage for travel therethrough of said wire to be stripped and at least one second passage crossing the first passage for delivering a pressurized stream of particles to impinge upon and strip the enamel coating from the wire, wherein the second passage is intersected by the first passage, the second passage having an inlet to direct the stream of particles into the chamber and onto the wire, and an outlet to remove particles from the chamber and into which the stream of particles is directed as it flows past the wire, and wherein the inlet and outlet are shaped and positioned so that the flow of the pressurized stream of particles along the second passage creates a partial vacuum at the junction with the first passage to draw particles and waste material into the outlet.

2. The apparatus of claim 1, wherein the first passage has a wire inlet end and a wire outlet end and the ends are sealed to prevent the escape of particles from the passage ends.

3. In combination, a coil winding machine and a wire stripping apparatus for stripping an enamel coating from a surface of a portion of a continuous length of wire intermediate the ends thereof, said wire stripping apparatus operable with a supply of enamel coated wire and means for moving said wire axially through said apparatus, the wire stripping apparatus comprising a first passage for a wire to be wound into a coil in the coil winding machine, and a second passage crossing the first passage for delivering a pressurized stream of particles to strip an enamel coating from the wire, wherein the second passage is shaped so that the flow of the pressurized stream along the second passage creates a partial vacuum at the junction with the first passage to substantially prevent particles from traveling along the first passage.

4. A wire stripping apparatus for stripping a coating from a portion of a continuous length of wire intermediate the ends thereof, the apparatus comprising a substantially closed chamber having a generally straight line path through the chamber for a wire to be stripped, the chamber having an inlet for the wire and an outlet for the wire, the wire passing through the chamber in a continuous length, a plurality of nozzles in the chamber at one end thereof adjacent the wire inlet for directing particle streams onto the wire to strip a coating from the wire, the nozzles directing the particle streams onto the wire at an acute angle to the straight line path, and the chamber having an outlet at another end thereof downstream of a region where the particle streams are directed onto the wire, for particles to remove as waste from the chamber the particles and coating material which has been stripped from the wire, and including means for applying vacuum to the outlet.

* * * * *